United States Patent Office 3,326,960
Patented June 20, 1967

3,326,960
METHINE COMPOUNDS CONTAINING THE CYANOMETHYLIDENE GROUP
Max A. Weaver, David J. Wallace, and James M. Straley, Kingsport, Tenn., assignors to Eastman Kodak Company, Rochester, N.Y., a corporation of New Jersey
No Drawing. Filed Sept. 16, 1964, Ser. No. 397,033
12 Claims. (Cl. 260—465)

This invention relates to methine compounds containing the cyanomethylidene group, particularly useful as dyes for textile materials.

The methine compounds of the invention containing the cyanomethylidene group have the general formula

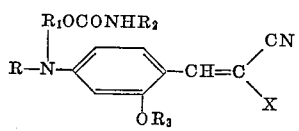

wherein R represents a benzene radical including phenyl and substituted phenyl such as alkylphenyl, e.g. tolyl; alkoxyphenyl, e.g. 2-methoxy and 2,5-dimethoxyphenyl; halophenyl, e.g. 3-chlorophenyl; carboalkoxyphenyl such as carbomethoxy; alkoxyalkyl, e.g. methoxyethyl; alkylthiopenyl, e.g. methylthiophenyl; alkylsulfonylphenyl, e.g. methylsulfonylphenyl; acyloxyphenyl, e.g. acetoxyphenyl; acetamidophenyl; cyanophenyl; nitrophenyl; alkylsulfonamidophenyl, e.g. methylsulfonamidophenyl and other substituted phenyl groups the substituents of which are selected so as to be inert under the conditions of synthesis described below. Accordingly, since the synthesis by Methods I and II involve use of alkylene oxides reactive with primary and second amino groups, and isocyanates reactive with hydroxy-containing groups, in order to obtain the desired methine compounds having the above general formula the benzene radical R of the amine starting material R—$NH_2$ is free of primary or secondary amino groups and hydroxyl-containing groups. Otherwise, the substituents attached to R are not critical, particularly when the methine compounds are used as textile dyes, and serve primarialy to control the color and shade of the methine compounds.

$R_1$ represents lower alkylene, straight or branch chained, as methylene, propylene and butylene.

$R_2$ represents either (1) lower alkyl, e.g. ethyl (2) cycloalkyl, e.g. cyclohexyl and cyclopropyl, (3) lower carboalkoxymethyl, e.g. —$CH_2COOCH_3$ or

—$CH_2COOCH_2H_5$ or (4) a benzene radical including phenyl and substituted phenyl such as those given above in illustration of R.

$R_3$ represents either lower alkyl such as methyl and butyl, or the radical —$C_2H_4OCONHR_2$ wherein $R_2$ has the meaning given above.

X represents a cyano, amido or lower carboalkoxy radical such as —$CONH_2$, —$CONHC_2H_5$,

—$COOCH_2CH_2CN$

—$COOCH_2CH_2OCH_3$, —$COOC_2H_5$ and

—$COOCH_2C_6H_5$

The methine compounds of the invention are synthesized, for example, by the following Methods I and II.

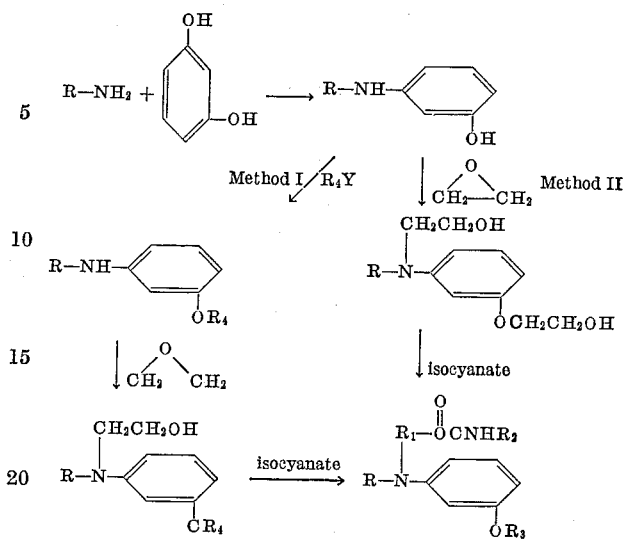

$R_4Y$ = alkyl halide or sulfate.
$R_3 = R_4$ when $R_3$ does not contain a carbamic acid ester residue.

The preparation of 3-hydroxydiphenylamines and 3-methoxydiphenylamines are well known. The hydroxyalkylations are accomplished by heating a mixture of the appropriate diphenylamine, a slight molar excess of the alkylene oxide, and ethanol in a stainless steel autoclave for example for 12 hours at 200° C. The products can be purified by distillation.

Herein, lower alkyl, lower alkylene and the like mean the carbon chain of the group contains 1 to 4 carbon atoms.

The aldehydes necessary for preparation of the final methine compounds are prepared by reacting the above diphenylamines with $POCl_3$— dimethylformamide as described in th examples, and have the general formula

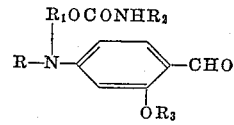

in which R, $R_1$, $R_2$ and $R_3$ have the meaning given above.

The final methine compounds are prepared by reaction of the above aldehydes with nitriles, such as malononitrile, containing an active methylene group and having the formula NC—$CH_2$—X in which X has the meaning given above, according to the following reaction

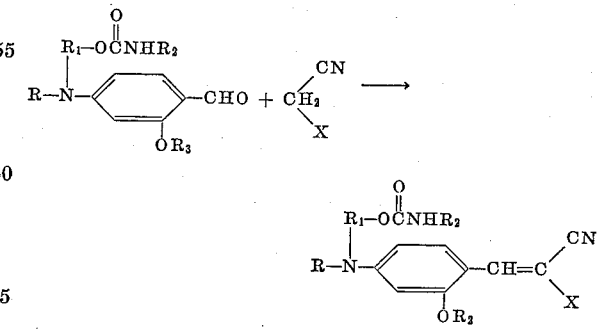

The methine compounds can be used for dyeing textile materials including synthetic polymer fibers, yarns and fabrics giving fast brilliant yellow shades when applied by conventional dyeing methods to polyester fibers. The methine compounds also have good affinity for cellulose ester and polyamide fibers. When the methine compounds are used for dyeing such hydrophobic materials they should be free of water-solubilizing groups such as sulfo and carboxy groups. In general, the dyes have good fastness, for example, to light, washing, gas (atmospheric fumes) and sublimation.

The following examples will serve to illustrate our invention.

Example 1

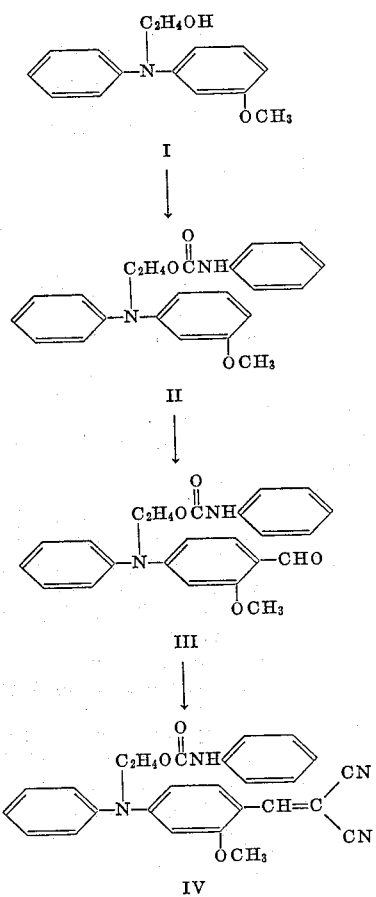

A. 24.3 g. of I above, 11.9 g. phenylisocyanate, and 25 ml. benzene were refluxed together for 2 hours. The benzene was removed in vacuo and the product, II, obtained in quantitative yield.

B. 36.2 g. of II was dissolved in 20 ml. dry dimethylformamide. This solution was cooled in an ice bath and 10 ml. POCl₃ was added dropwise at 20–30° C. After 1 hour heating on the steam bath, the reaction was poured into 300 ml. ice-water mixture, then made basic with 50% aqueous NaOH. The product came down as a yellow oil which solidified when slurried in alcohol. The yield of III was 26.6 g. M.P. 172–174° C.

C. 1.95 g. III, 0.33 g. malononitrile, 3 drops of piperidine, and 25 ml. ethanol were refluxed 1 hour, allowed to cool, filtered, dried. The yield of IV was 1.6 g. This compound dyes cellulose acetate, polyester, and modacrylic fibers a beautiful green-yellow shade of excellent fastness properties.

Example 2

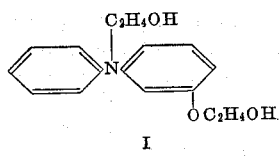

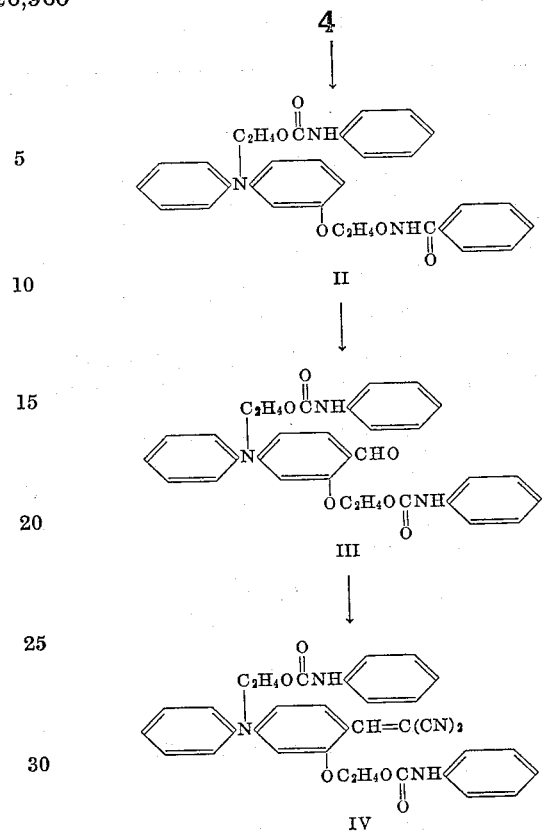

A. 27.3 g. I in 100 ml. benzene was heated to solution at reflux and then 23.8 g. phenyl isocyanate was added dropwise. After addition was complete, the solution was refluxed 2 hours, then allowed to cool. The product, II, which crystallized out was filtered off, washed with ethanol and dried. Yield 31.4 g., M.P. 177–181° (purified, M.P. 182–183°).

B. 15.4 g. II was dissolved in 30 ml. dry dimethylformamide by heating to about 80° C. The solution was cooled in an ice bath and 3 ml. POCl₃ was added dropwise below 30°. After one hour heating on the steam bath, the reaction was drowned in 300 ml. ice water. This mixture was made basic with 10% aqueous NaOH and the product, III, solidified on 1 hour standing. The solid was filtered off, washed with water, and dried. Yield, 16.0 g.

C. 2.70 g. III, 0.33 g. malononitrile, 3 drops piperidine, and 15 ml. ethanol were refluxed together for 1 hour, then allowed to cool, an oil separated out, which solidified when the reaction mixture was drowned in 100 ml. of water. The solid, IV, was filtered off, washed with water, and dried. Yield, 2.4 g., M.P. 80–90° C. Recrystallized from benzene the dye melted at 105–109° C. It dyed cellulose acetate and polyester fibers a brilliant green-yellow shade with excellent fastness properties and exceptionally good resistance to sublimation.

In the manner of Examples 1 and 2 other methine compounds having the above general formula are prepared by replacing phenylisocyanate by isocyanates having the formula R₂NCO in which R₂ has the meaning given above. For example, butylisocyanate, C₂H₅OCOCH₂NCO, p-bromophenylisocyanate, cyclohexylisocyanate and other isocyanates are reacted with hydroxyalkyl diphenylamines such as Compound I of Example 1, Compound I of Example 2, or the following compounds:

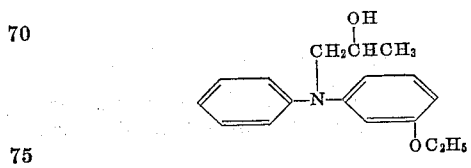

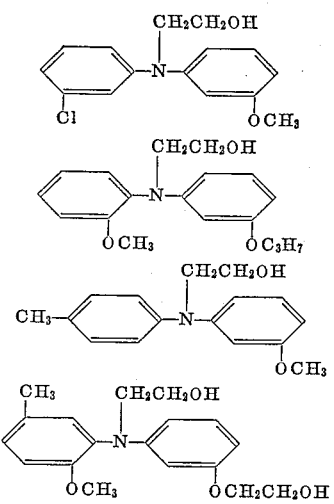

followed by formylation of the resulting products using POCl₃ and dimethylformamide and thereafter reaction with the nitriles of formula NC—CH₂—X to obtain the methine compounds described in claims 9 to 13 hereinafter as well as methine compounds having the formulas

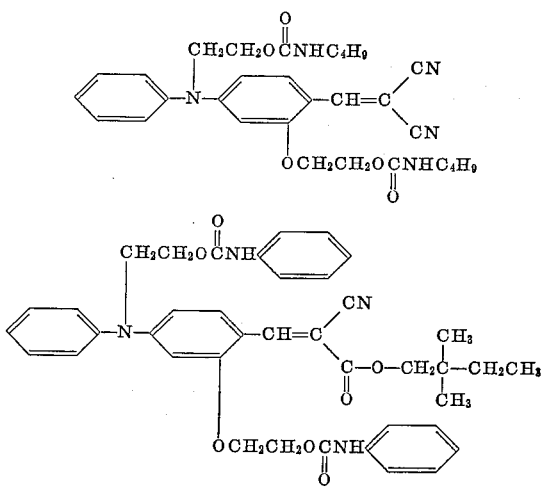

The methine compounds of the invention may be used for dyeing hydrophobic fibers such as linear polyester, cellulose ester, acrylic, polyamide, etc. fibers in the manner described in U.S. Patents 2,880,050, 2,757,064, 2,782,187 and 3,043,827. The following example illustrates methods by which the methine compounds of the invention can be used to dye textile materials.

0.1 gram of the dye is dissolved in the dye pot by warming in 5 cc. of ethylene glycol monomethyl ether. A 2% Igepon T and 0.5% sodium lignin sulfonate aqueous solution is added, with stirring, until a fine emulsion is obtained. Water is then slowly added to a total volume of 200 cc., 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda-ash solution. After scouring, the fabric is rinsed with water and dried. Accordingly, since the methine compounds of the invention are water-insoluble, they can be applied from aqueous dispersions in the manner of the so-called "dispersed dyes." However, coloration can also be effected, for example, by incorporating the methine compounds into the spinning dope and spinning the fiber as usual. The methine compounds of our invention have varying utility as dyes. The degree of utility varies, for example, depending upon the material being dyed and the formula of the methine compound. Thus, for example, all the dyes will not have the same degree of utility for the same material.

Cellulose esters which can be dyed with the methine compounds include cellulose aliphatic carboxylic acid esters having 2 to 4 carbon atoms in the acid groups thereof, by which we mean to include, for example, both partially hydrolyzed and unhydrolyzed cellulose acetate, cellulose propionate and cellulose acetate-butyrate.

Polymeric linear polyester materials of the terephthalate type are illustrative of the linear aromatic polyester textile materials that can be dyed with the new methine compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the methine compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. Methine compounds having the general formula

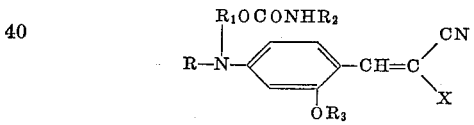

wherein

R=a benzene radical free of primary and secondary amino groups, hydroxyl groups, sulfo and carboxyl groups,
$R_1$=lower alkylene,
$R_2$=a member of the class consisting of lower alkyl, a benzene radical, lower cycloalkyl and lower carbalkoxymethyl,
$R_3$=a member of the class consisting of lower alkyl and —$C_2H_4OCONHR_2$, and
X=a member of the class consisting of cyano, $CONH_2$ and a lower carboalkoxyl radical.

2. Methine compounds designated in claim 1 wherein

R=a benzene radical free of primary and secondary amino groups, hydroxyl groups, sulfo and carboxyl groups,
$R_1$=lower alkylene,
$R_2$=a benzene radical,
$R_3$=lower alkyl, and
X=cyano.

3. Methine compounds designated in claim 1 wherein

R=a benzene radical free of primary and secondary amino groups, hydroxyl groups, sulfo and carboxyl groups,
$R_1$=lower alkylene,
$R_2$=lower alkyl,
$R_3$=lower alkyl, and
X=$CONH_2$.

4. Methine compounds designated in claim 1 wherein
R = a benzene radical free of primary and secondary amino groups, hydroxyl groups, sulfo and carboxyl groups,
$R_1$ = lower alkylene,
$R_2$ = lower alkyl,
$R_3$ = lower alkyl, and
X = a lower carboalkoxy radical.

5. Methine compounds designated in claim 1 wherein
R = a benzene radical free of primary and secondary amino groups, hydroxyl groups, sulfo and carboxyl groups,
$R_1$ = lower alkylene,
$R_2$ = a benzene radical,
$R_3$ = —$C_2H_4OCONHR_2$, and
X = cyano.

6. The compound

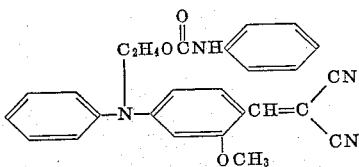

7. The compound

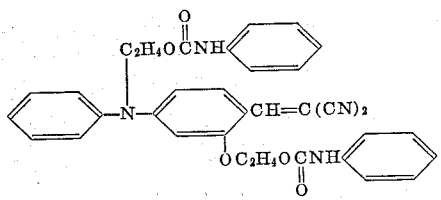

8. The compound

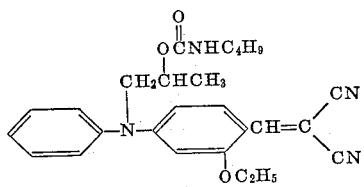

9. The compound

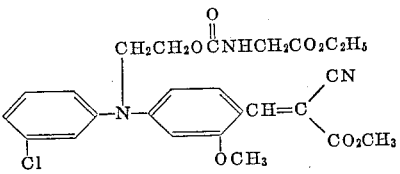

10. The compound

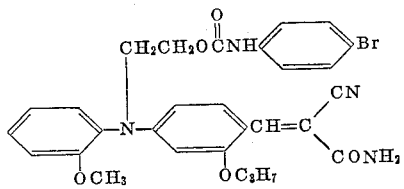

11. The compound

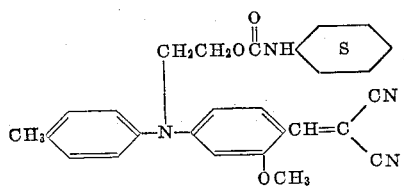

12. The compound

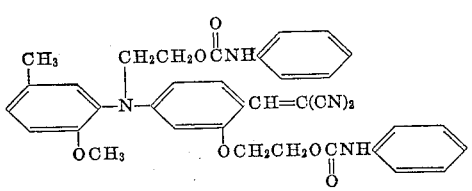

No references cited.

CHARLES B. PARKER, *Primary Examiner.*
DOLPH H. TERRENCE, *Assistant Examiner.*